United States Patent [19]
Fiebrich et al.

[11] Patent Number: 5,560,016
[45] Date of Patent: Sep. 24, 1996

[54] SYSTEM AND METHOD FOR DYNAMIC BUS ACCESS PRIORITIZATION AND ARBITRATION BASED ON CHANGING BUS MASTER REQUEST FREQUENCY

[75] Inventors: Greg R. Fiebrich; Oscar Leal, both of Austin, Tex.

[73] Assignee: Dell USA, L.P., Austin, Tex.

[21] Appl. No.: 319,204

[22] Filed: Oct. 6, 1994

[51] Int. Cl.$^6$ .................................................. G06F 13/36
[52] U.S. Cl. ........................ 395/728; 395/296; 395/732
[58] Field of Search ...................... 395/296, 303, 395/861

[56] References Cited

U.S. PATENT DOCUMENTS

| | | | |
|---|---|---|---|
| 3,399,384 | 8/1968 | Crockett et al. | 395/861 |
| 4,974,148 | 11/1990 | Matteson | 395/550 |
| 5,016,167 | 5/1991 | Nguyen et al. | 395/478 |
| 5,025,370 | 6/1991 | Koegel et al. | 395/729 |
| 5,241,632 | 8/1993 | O'Connell et al. | 395/297 |
| 5,274,774 | 12/1993 | Manber et al. | 395/305 |
| 5,377,332 | 12/1994 | Entwistle et al. | 395/297 |
| 5,420,985 | 5/1995 | Cantrell et al. | 395/293 |
| 5,440,752 | 8/1995 | Lentz et al. | 395/800 |

*Primary Examiner*—Jack B. Harvey
*Assistant Examiner*—Sumati Lefkowitz
*Attorney, Agent, or Firm*—Henry N. Garrana; Mark P. Kahler; Michelle M. Turner

[57] ABSTRACT

In a computer system having a plurality of devices coupled to a bus, the plurality of devices having a bus master mode allowing a selected one of the devices to function as a bus master and adapted to request designation as a bus master, an arbitration circuit and method of arbitration for determining which one of the plurality of devices is to function as the bus master when two of the plurality of devices coincidentally request the designation. The arbitration circuit comprises: (1) a tabulation circuit for tabulating a relative number of times each of the plurality of devices requests designation as bus master of each of the plurality of devices and (2) a comparison circuit coupled to the tabulation circuit for granting only one of the coinciding requests as a function of the relative number of times each of the plurality of devices requests designation as bus master to thereby allow a bus master priority level between the plurality of devices to change as a function of the relative request activity of the plurality of devices.

50 Claims, 2 Drawing Sheets

SYSTEM AND METHOD FOR DYNAMIC BUS ACCESS PRIORITIZATION AND ARBITRATION BASED ON CHANGING BUS MASTER REQUEST FREQUENCY

TECHNICAL FIELD OF THE INVENTION

The present invention is directed, in general, to computer systems and, more specifically, to a system and method for dynamically arbitrating priority among several computer system devices vying for access to a common bus.

BACKGROUND OF THE INVENTION

Efficient management and allocation of hardware resources is essential to the speed, effectiveness and, hence, success in the marketplace of a computer system. Standard computer system architecture calls for a number of special-function electronic subsystems or devices to be interconnected by one or more buses, allowing communication of electronic data between the subsystems or devices. In most computer systems, and in personal computers ("PCs") in particular, the buses represent a precious hardware resource that is allocable to only one communication task at a time. Thus, it is vital that the bus not be allowed to idle or be occupied with communication tasks of less than the most optimal priority.

Among the various electronic devices of the computer system, one is designated as bus master, actively in charge of directing the use of bus resources. In early PCs, the microprocessor central processing unit ("CPU") exclusively played the role of bus master. However, in more recent and sophisticated computer architectures, devices other than the CPU may be equipped with a bus master mode wherein control of the bus from a designated one of the devices is possible. For instance, PCs built around an Industry-Standard Architecture ("ISA") or an Extended Industry-Standard Architecture ("EISA") may be equipped with a Small Computer Systems Interface ("SCSI") controller or network interface controller ("NIC") having a bus master mode. PCs having a bus conforming to Intel's Peripheral Component Interconnect ("PCI") standard may be equipped with an ISA controller, allowing an ISA bus to be appended to the PCI bus.

In all PCs, however, only one device can act as bus master at a given time. Thus, the various devices that can act as bus master are provided with the ability to generate a signal representing a request to be designated as bus master. Bus control circuitry, associated with the bus, grants the requests as they are received, allowing control of the bus to pass among the various possible bus master-capable devices.

Unfortunately, conflicts sometimes arise wherein two or more devices make coincidental or concurrent requests for designation as bus master. To address such possibility, the prior art has provided arbitration circuitry that resolves such conflicts by assigning relative priority to the various devices. Should the bus control circuitry receive coincidental requests, the device having the greatest priority wins and is granted bus master status.

In such prior art systems, this relative priority among the devices is pre-assigned during design of the PC and is static and immutable during the life of the PC. Static pre-assignment of priority causes several problems. First, there may be times during normal operation of a PC during which some devices that have been pre-assigned a low priority require unusually intensive use of the bus. During such times, the assigned priority is inappropriately low, resulting in bus master requests of the unusually active device not being granted and the device being deprived of appropriate use of the bus. Second, the factory-set device priorities are optimized for typical PC use, generally resulting in the CPU receiving by far the highest bus master priority because so many users engage their PCs in CPU-intensive activity. Some users, however, subject their PCs to nonstandard use, perhaps engaging in unusually disk or network-access intensive activities. Unfortunately, although the pre-assigned device priorities are inappropriate, they are immutable. Both of these problems result in loss of system performance and effectiveness, ultimately compromising user acceptance and marketability.

Third, and perhaps most critically, IBM-compatible PCs are open architecture systems wherein slots are provided for the insertion of expansion cards. The open architecture design of such PCs allows for a great number of alternative hardware configurations, but presents a problem for the PC designer in the pre-assignment of device priorities. In short, it is impossible for any one static assignment of priority to result in optimum system performance regardless of hardware configuration. Thus, the prior art static assignment of device priorities during system design is wholly inadequate to ensure the optimum allocation of bus resources among the various devices requesting bus master designation.

Accordingly, what is needed in the art are a circuit and method for arbitration of bus master requests that adapts to changing activity on the part of the devices requesting bus master designation to adjust dynamically the allocation of bus resources in response to differing system demands.

SUMMARY OF THE INVENTION

To address the above-discussed deficiencies of the prior art, it is a primary object of the present invention to provide a circuit and method for dynamic bus master arbitration that adapts to changing bus master request frequency among the various devices of a computer system to account for changes in computer use.

In the attainment of the above primary object, the present invention provides, in a computer system having a plurality of devices coupled to a bus, the plurality of devices having a bus master mode allowing a selected one of the devices to function as a bus master and adapted to request designation as a bus master, an arbitration circuit and method of arbitration for determining which one of the plurality of devices is to function as the bus master when two of the plurality of devices coincidentally request the designation. The arbitration circuit comprises: (1) a tabulation circuit for tabulating a relative request activity of each of the plurality of devices and (2) a comparison circuit coupled to the tabulation circuit for granting only one of the coinciding requests as a function of the relative request activity to thereby allow a bus master priority level between the plurality of devices to change as a function of an activity of the plurality of devices. In a preferred embodiment of the present invention, relative request activity is tabulated by counting a relative number of times each of the plurality of devices requests the designation as the bus master.

Thus, the present invention introduces a dynamic, adaptive bus master arbitration circuit that, in effect, looks at a moving window of time to determine which devices have been most active within the window of time to determine device priority.

In a preferred embodiment of the present invention, the tabulation circuit comprises a counting circuit adapted to change state when the request for designation is made. In a more preferred embodiment, the tabulation circuit provides a plurality of counting circuits corresponding to each of the plurality of devices. In a still more preferred embodiment, the tabulation circuit comprises a first counting circuit corresponding to a first device of the plurality of devices and a second counting circuit corresponding to a second device of the plurality of devices, the first counting circuit incrementing and the second counting circuit decrementing when the first device requests the designation. When any of the plurality of devices issues a request to be designated bus master, the counting circuit within the tabulation circuit associated with the requesting device increments and all other counting circuits decrement.

In a preferred embodiment of the present invention, the circuit further comprises a storage circuit for storing initial arbitration values, the initial arbitration values initially determining which of the plurality of devices is to function as the bus master. When the computer system is started ("booted"), the counting circuits are initialized with zero values. The initial arbitration values are supplied to prevent the counting circuits from initially appearing to indicate an equal relative number of bus master request occurrences and, hence, an equal priority for each of the plurality of devices.

In a more preferred embodiment of the present invention, the storage circuit is embodied in the tabulation circuit itself. Thus, in the more preferred embodiment, the initial arbitration values are loaded into the counting circuits to initialize the same to values reflecting a reasonable initial device priority. In a preferred embodiment of the present invention, the initial arbitration values are loaded into the storage circuit via a port coupled to the bus.

In a preferred embodiment of the present invention, the comparison circuit comprises a comparator for comparing numbers of times each of the plurality of devices requests the designation as the bus master. In the embodiment to be illustrated, the comparison circuit is a matrix of comparators linking permuted pairs of the counting circuits, allowing a value comparison to be made between any two of the counting circuits. Therefore, in a preferred embodiment of the present invention, a deadlock circuit coupled to the tabulation circuit comprises a plurality of comparators for comparing predetermined priorities among the plurality of devices to thereby determine which one of the plurality of devices is to function as the bus master when the two of the plurality of devices have requested the designation as the bus master an equal relative number of times.

In a preferred embodiment of the present invention, the circuit further comprises a deadlock circuit for determining which one of the plurality of devices is to function as the bus master when the two of the plurality of devices have requested the designation as the bus master an equal relative number of times. This covers the possibility that any two given counting circuits may contain the same value. In effect, the deadlock circuit is a second-level static arbitration circuit.

In a preferred embodiment of the present invention, a port coupled to the tabulation circuit allows the relative number of times each of the plurality of devices requests the designation as the bus master to be read from the tabulation circuit. In a manner to be described, the ability to read and write relative numbers of times (affecting device priority) allows priorities to be changed and restored on demand.

In a preferred embodiment of the present invention, the comparison circuit transmits a bus grant signal to a storage device, the bus grant signal representing a pending grant of the only one of the coinciding requests. In the embodiment to be illustrated, the storage device takes the form of a first-in, first-out ("FIFO") queue.

In a preferred embodiment of the present invention, the computer system further comprises bus monitoring circuitry for controlling assertion of grants onto the bus. When the bus monitoring circuitry determines that a grant should be asserted, the least-recently-stored grant is read from the FIFO queue and asserted onto the bus to complete redesignation of bus master status.

Although those of skill in the art will recognize that the present invention is useful in all classes of computer systems wherein multiple bus master devices are provided, in a preferred embodiment of the present invention, the computer system is a PC.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
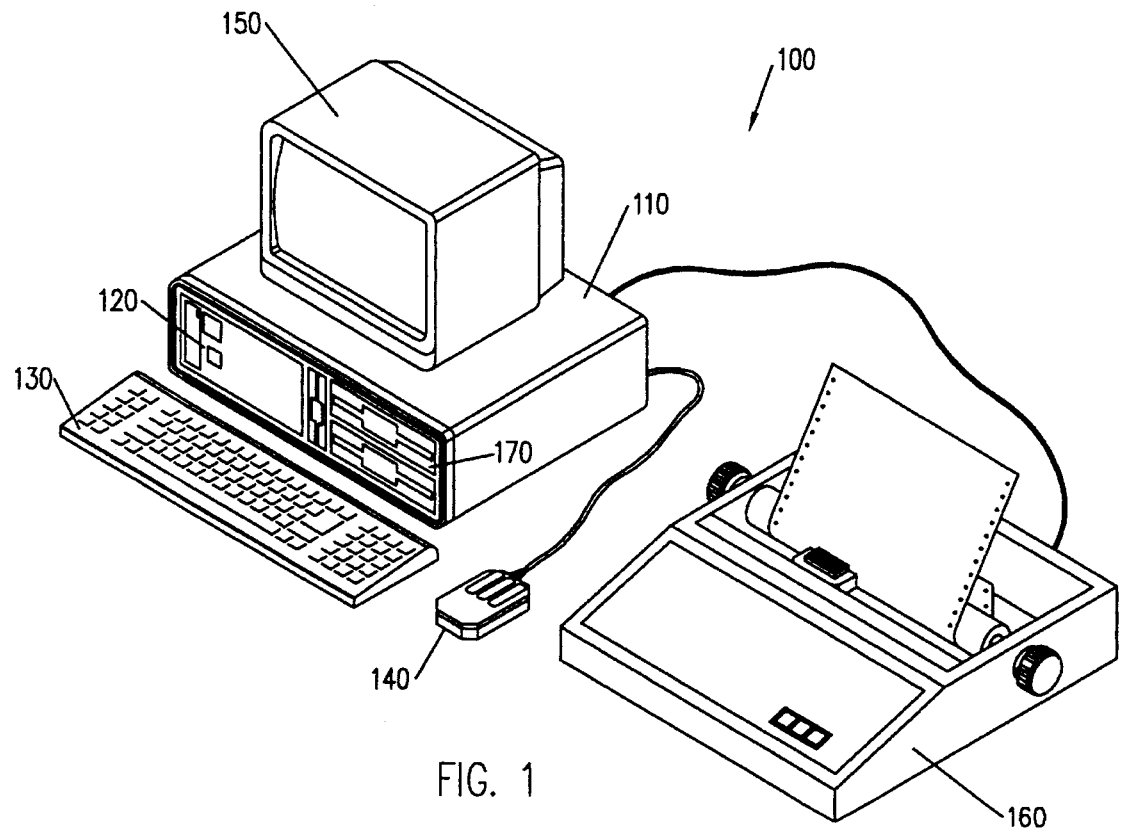
FIG. 1 illustrates an isometric view of a PC that serves as an environment within which the present invention can operate.

Referring initially to FIG. 1, illustrated is an isometric view of a PC 100 that provides an environment within which the present invention can operate. Since the present invention is not limited to application in a PC environment, however, FIG. 1 is illustrative only. The PC 100 includes a main chassis 110, a dedicated hardware reset switch 120, a keyboard 130, a mouse 140, a monitor or display device 150, a printer 160 and a disk drive 170 employed as a nonvolatile secondary storage device. The main chassis 110 houses various electronic components of the PC 100 (to be illustrated in FIG. 2).

The display device 150 and the keyboard 130 cooperate to allow communication between the PC 100 and a user. The mouse 140 provides a means by which the user can point to data displayed on the display device 150 to take action with respect thereto.

The dedicated hardware reset switch 120 is adapted to trigger hardware reset circuitry (not shown) within the main chassis 110 to "reboot" or restart the PC 100 when the user depresses the reset switch 120. The main chassis 110 further includes a power switch (not shown) capable of interrupting power from a main electrical power source (not shown in FIG. 1) to the PC 100. Interruption and restoration of power also brings about a restart of the PC 100.

Figure 2:
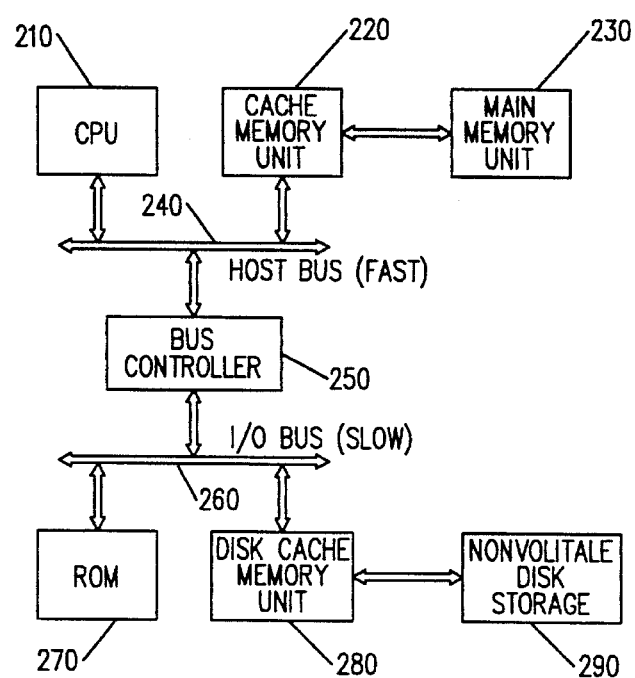
FIG. 2 illustrates a block diagram of electronic components within the PC of FIG. 1.

Turning now to FIG. 2, illustrated is a block diagram of electronic components within the main chassis 110 of the PC 100 of FIG. 1. In a preferred embodiment, a microprocessor central processing unit ("CPU") 210 is coupled to a bus controller 250 via a host bus 240. A cache memory unit 220 comprising relatively fast DRAM is coupled between the host bus 240 and a slower DRAM main memory unit 230. The cache memory unit 220 serves as a temporary repository for data communicated between the main memory unit 230 and the CPU 210. Since the cache memory unit 220 is fast, the communication of data between the main memory unit 230 and the CPU 210 is speeded. The host bus 240 is capable of transmitting address and data signals at a relatively high speed between the CPU 210, the cache memory unit 220 and the bus controller 250.

The bus controller 250 is also attached to an expansion or input/output ("I/O") bus 260. The I/O bus 260, in contrast to the host bus 240, is only capable of transmitting address and data signals at relatively low speeds. Also attached to the I/O bus 260 are a basic I/O system read-only memory ("BIOS ROM") 270 and a series of extended industry-standard architecture ("EISA") slots adapted to receive EISA daughter cards therein. The BIOS ROM 270 is comprised of several individual ROM chips coupled together to provide permanent storage for the computer system's power-on-self-test ("POST") and BIOS instructions. One of the EISA slots contains a disk cache memory unit 280 coupled between the I/O bus 260 and nonvolatile disk storage 290, such as the disk drive 170 of FIG. 1.

As can be seen in FIG. 2, the bus controller 250 is coupled between the host bus 240 and the I/O bus 260. The bus controller 250 is responsible for managing all communication of address and data signals between the host bus 240 and the I/O bus 260.

Figure 3:
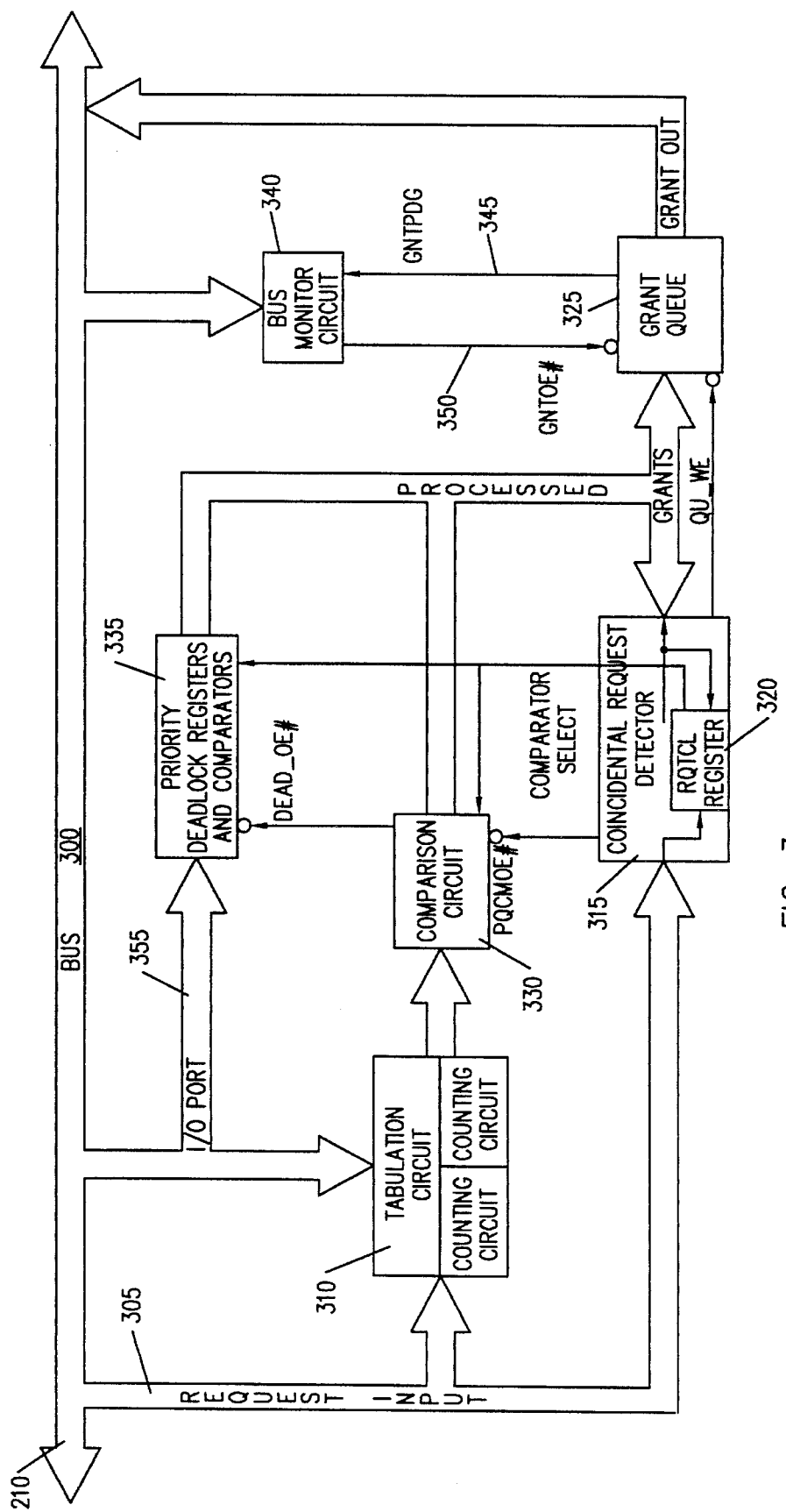
FIG. 3 illustrates a block diagram of the arbitration circuit according to the present invention.

Turning now to FIG. 3, illustrated is a block diagram of the arbitration circuit according to the present invention. Shown is a bus 300 that may be the I/O bus 260 of FIG. 2, but may also be any ISA, EISA, VL-Bus, PCI or bus of other, perhaps proprietary, design as previously described. The bus 300 provides the medium for communication of data between the various devices detailed above, including those that can act as bus master upon request and when so designated.

When a device issues a request to be made bus master, the request itself is transmitted along the bus 300 and via lines 305 to a tabulation circuit 310 comprising a plurality of counting circuits in the form of up/down counters.

In the illustrated embodiment of the present invention, the tabulation circuit 310 contains one up/down counter for each possible bus master device. For instance, if the PC 100 is an open architecture PC having four expansion slots, it must be assumed that each of the expansion slots could contain a bus master-capable device. Therefore, the tabulation circuit 310 contains five up/down counters (one for each expansion slot and one for the CPU 210).

The up/down counters are conventional in design, but are adapted not to roll over when their limits are reached. In other words, when a particular up/down counter is at its maximum value, it will not roll over to zero when commanded to increment. Neither will the up/down counter assume its maximum value when at zero and commanded to decrement. Those of ordinary skill in the art will readily comprehend how to construct an up/down counter having these attributes.

It is a design choice as to how many bits the up/down counters are to have. The number of bits, and hence the number of states or counts the up/down counters can store, determine, in effect, the length of a window of time over which the relative frequency of bus master requests is tabulated (in a manner that will become more apparent). If the up/down counters are given too many bits, then the window of time will be too long, and the arbitration circuit will not be as responsive to changes in device activity that may merit a change in bus master priority. On the other hand, if the up/down counters are given too few bits, the chance of any two given counters having an equal value at a given time increases. This defeats the purpose of tabulating device activity, inasmuch as a deadlock circuit to be described must then be called upon to resolve the conflict statically. For purposes of the present example, it will be assumed that the up/down counters are 3 bits wide, yielding, in effect, eight levels of bus master priority.

Each of the up/down counters is assigned to a particular device. For instance, the first up/down counter is assigned to the CPU 210 and the second through fifth up/down counters are assigned to the first through fourth expansion slots, respectively. The up/down counter corresponding to a requesting device is incremented and the other up/down counters are decremented. When the CPU 210 issues a request to be bus master, the request is transmitted along the bus 300 and, via lines 305, to the tabulation circuit 310, wherein the first up/down counter is incremented and the second through fifth up/down counters are decremented (remember that, if the second through fifth up/down counters are already at zero, they remain at zero and are not rolled over). Thus, the CPU 210 is given a higher priority than the other devices.

As the CPU 210 and the other devices issue requests to be designated bus master, the various corresponding up/down counters are incremented or decremented in response, such that the up/down counters tabulate a relative number of times each of the devices requests the designation as bus master, yielding a travelling window of relative device activity and a dynamic determination of priority.

As the requests are received in the tabulation circuit 310, they are also received in a coincidental request detection circuit 315 via the lines 305. The coincidental request detection circuit 315 latches each request in a RQCTL register 320. If only one request is latched into the RQCTL register in a given clock cycle, then there is no arbitration to be done, and the single request is granted by being transmitted to a grant queue 325 (a FIFO queue) that holds the granted request until it can be asserted onto the bus 300.

If two or more requests are latched into the RQCTL register 320 in a given time period, the coincidental request detection circuit 315 detects the conflict and activates one of a matrix of comparators in a comparison circuit 330 to compare the frequency at which the two corresponding contending devices have requested bus master status within the window of time recorded by the tabulation circuit 310. The matrix of comparators within the comparison circuit 330 allows selective comparison of any two of the five up/down counters in the tabulation circuit 310. Thus, in the example wherein there are five up/down counters in the tabulation circuit, there are fifteen (15) comparators in the comparator matrix. The particular comparator coupled to the two up/down counters corresponding to the two competing devices generates a comparison output depending upon whether one of the up/down counters is greater than, less than or equal to the other of the up/down counters. If the comparison value indicates a greater-than or less-than relationship, the request of the device corresponding to the up/down counter having the greater value is granted. Thus, the device having the greatest activity within the window of time tabulated prevails in the arbitration. The request is transmitted from the RQCTL register 320 to the grant queue 325 pending assertion onto the bus 300.

If the comparison output of the comparator indicates that the up/down counters are equal in value, then the dynamic portion of the arbitration circuit is in deadlock. A deadlock circuit 335 comprising registers corresponding to each of the devices and comparators is called upon to resolve the deadlock statically. The deadlock circuit 335 stores values for each of the devices representing their relative priority. The values are pre-assigned so as not to be the same. A matrix of comparators is again employed to compare any two of the registers. The request of the device having the greatest corresponding register value prevails. Again, the request of the prevailing device is transmitted from the RQCTL register 320 to the grant queue 325 pending assertion onto the bus 300.

A bus monitoring circuit 340 monitors the bus 300. When the bus monitoring circuit 340 detects a pending request (via a line 345) and a bus 300 condition allowing assertion of the pending grant on the bus 300, the bus monitoring circuit 340 produces a signal on a line 350, causing the least-recently-stored grant to be read from the grant queue 325 and asserted onto the bus 300 to complete redesignation of bus master status to the prevailing device.

A point of novelty of the present invention is that the up/down counters of the tabulation circuit 310 and the registers of the deadlock circuit 330 are programmable. A port 355 coupled to the bus 300 allows data to be written to, and preferably read from, the up/down counters of the tabulation circuit 310 and the registers of the deadlock circuit 330. When writing data to the up/down counters, the data take the form of initial arbitration values, allowing the window of time represented in the up/down counters to be initialized. When writing data to the registers, the data take the form of preprogrammed priorities to be used in the event of deadlock. Thus, the system designer can supply initial and deadlock default static priority value to the arbitration circuit without disabling the primary function of dynamic arbitration according to the present invention.

As mentioned above, the port 355 preferably allows the data to be read from the up/down counters and registers. This is useful when, under software control, priorities may need to be shifted for a short period of time to optimize system performance.

For instance, if a user employs a networked PC in a CPU-intensive task, the arbitration circuit of the present invention will reflect the CPU intensity by maintaining the CPU's corresponding up/down counter in an elevated state. If network software is designed to perform a backup of the user's data periodically and automatically, the network software can take advantage of the present invention by reading the relative priorities stored in the up/down counters and the preprogrammed priorities in the deadlock registers and writing new initial arbitration values and preprogrammed priorities into the up/down counters and deadlock registers (that reflect a new priority on network-intensive backup activity). Once the network-intensive backup activity is completed, the original relative priorities and preprogrammed deadlock priorities can be rewritten, returning the PC to the state in which it was prior to intervention.

From the above description, it is apparent that the present invention provides, in a computer system having a plurality of devices coupled to a bus, the plurality of devices having a bus master mode allowing a selected one of the devices to function as a bus master and adapted to request designation as a bus master, an arbitration circuit and method of arbitration for determining which one of the plurality of devices is to function as the bus master when two of the plurality of devices coincidentally request the designation. The arbitration circuit comprises: (1) a tabulation circuit for tabulating a relative request activity of each the plurality of devices and (2) a comparison circuit coupled to the tabulation circuit for granting only one of the coinciding requests as a function of the relative request activity to thereby allow a bus master priority level between the plurality of devices to change as a function of an activity of the plurality of devices.

Although the present invention and its advantages have been described in detail, those skilled in the art should understand that they can make various changes, substitutions and alterations herein without departing from the spirit and scope of the invention in its broadest form. For example, what has been discussed above is a situation where two devices are competing for bus access at the same time. It is envisioned that applicant's invention could also be used in an environment where three or more devices compete for bus access at the same time. In such a situation, the three devices could have the same priority, or in the alternative, one of the devices could have a higher priority than the other two. Criteria for determining the order of bus grants can be provided for based on recorded activity, or intuitive designated priorities. Moreover, it is possible within the scope of the present invention to apply a multiplier to particular device priorities (within the tablulation circuit 310) to act as a weighting factor in establishing higher activity counts for some devices, and lower activity counts for other devices.

What is claimed is:

1. In a computer system having a plurality of devices coupled to a bus, said plurality of devices having a bus master mode allowing a selected one of said devices to function as a bus master and adapted to request designation as a bus master, an arbitration circuit for determining which one of said plurality of devices is to function as said bus master when two of said plurality of devices coincidentally request said designation, comprising:

a tabulation circuit for tabulating a relative request activity of each of said plurality of devices; and a comparison circuit coupled to said tabulation circuit for granting only one of said coinciding requests as a function of said relative request activity to thereby allow a bus master priority level between said plurality of devices to change as a function of an activity of said plurality of devices.

2. The arbitration circuit as recited in claim 1 wherein said tabulation circuit comprises a counting circuit adapted to change state when said request for designation is made.

3. The arbitration circuit as recited in claim 1 wherein said tabulation circuit comprises a plurality of counting circuits corresponding to each of said plurality of devices.

4. The arbitration circuit as recited in claim 1 wherein said tabulation circuit comprises a first counting circuit corresponding to a first device of said plurality of devices and a second counting circuit corresponding to a second device of said plurality of devices, said first counting circuit incrementing and said second counting circuit decrementing when said first device requests said designation.

5. The arbitration circuit as recited in claim 1 further comprising a circuit for storing initial arbitration values, said initial arbitration values initially determining which of said plurality of devices is to function as said bus master.

6. The arbitration circuit as recited in claim 1 wherein said comparison circuit comprises a comparator for comparing numbers of times said each of said plurality of devices requests said designation as said bus master.

7. The arbitration circuit as recited in claim 1 further comprising a deadlock circuit for determining which one of said plurality of devices is to function as said bus master when said two of said plurality of devices have requested said designation as said bus master an equal relative number of times.

8. The arbitration circuit as recited in claim 1 wherein said comparison circuit transmits a bus grant signal to a storage device, said bus grant signal representing a pending grant of said only one of said coinciding requests.

9. The arbitration circuit as recited in claim 1 wherein said computer system further comprises bus monitoring circuitry for controlling assertion of grants onto said bus.

10. The arbitration circuit as recited in claim 1 wherein said computer system is a personal computer (PC).

11. In a computer system having a plurality of devices coupled to a bus, said plurality of devices having a bus master mode allowing a selected one of said devices to function as a bus master and adapted to request designation as a bus master, a method for determining which one of said plurality of devices is to function as said bus master when two of said plurality of devices coincidentally request said designation, comprising the steps of:

tabulating a relative request activity of each of said plurality of devices; and granting only one of said coinciding requests as a function of said relative request activity to thereby allow a bus master priority level between said plurality of devices to change as a function of an activity of said plurality of devices.

12. The method as recited in claim 11 wherein said step of tabulating comprises the step of changing a state of a counter when said request for designation is made.

13. The method as recited in claim 11 wherein said step of tabulating comprises the step of providing a plurality of counting circuits corresponding to each of said plurality of devices.

14. The method as recited in claim 11 wherein said step of tabulating comprises the step of providing a first counting circuit corresponding to a first device of said plurality of devices and a second counting circuit corresponding to a second device of said plurality of devices, said first counting circuit incrementing and said second counting circuit decrementing when said first device requests said designation.

15. The method as recited in claim 11 further comprising the step of storing initial arbitration values, said initial arbitration values initially determining which of said plurality of devices is to function as said bus master.

16. The method as recited in claim 11 wherein said step of granting comprises the step of providing a comparator for comparing numbers of times said each of said plurality of devices requests said designation as said bus master.

17. The method as recited in claim 11 further comprising the step of providing a deadlock circuit for determining which one of said plurality of devices is to function as said bus master when said two of said plurality of devices have requested said designation as said bus master an equal relative number of times.

18. The method as recited in claim 11 further comprising the step of transmitting a bus grant signal to a storage device, said bus grant signal representing a pending grant of said only one of said coinciding requests.

19. The method as recited in claim 11 further comprising the step of controlling assertion of grants onto said bus.

20. The method as recited in claim 11 wherein said computer system is a personal computer (PC).

21. In a personal computer (PC) having a plurality of devices coupled to a bus, said plurality of devices having a bus master mode allowing a selected one of said devices to function as a bus master and adapted to request designation as a bus master, an arbitration circuit for determining which one of said plurality of devices is to function as said bus master when two of said plurality of devices coincidentally request said designation, comprising:

a tabulation circuit for counting a relative number of times each of said plurality of devices requests said designation as said bus master;

a comparison circuit coupled to said tabulation circuit for granting only one of said coinciding requests as a function of said relative number of times and comprising a comparator for comparing numbers of times said each of said plurality of devices requests said designation as said bus master to thereby allow a bus master priority level between said plurality of devices to change as a function of an activity of said plurality of devices;

a storage circuit for storing initial arbitration values, said initial arbitration values initially determining which of said plurality of devices is to function as said bus master; and bus monitoring circuitry for controlling assertion of grants onto said bus.

22. The arbitration circuit as recited in claim 21 wherein said tabulation circuit comprises a counting circuit adapted to change state when said request for designation is made.

23. The arbitration circuit as recited in claim 21 wherein said tabulation circuit comprises a plurality of counting circuits corresponding to each of said plurality of devices.

24. The arbitration circuit as recited in claim 21 wherein said tabulation circuit comprises a first counting circuit corresponding to a first device of said plurality of devices and a second counting circuit corresponding to a second device of said plurality of devices, said first counting circuit incrementing and said second counting circuit decrementing when said first device requests said designation.

25. The arbitration circuit as recited in claim 21 further comprising a deadlock circuit for determining which one of said plurality of devices is to function as said bus master when said two of said plurality of devices have requested said designation as said bus master an equal relative number of times.

26. The arbitration circuit as recited in claim 21 wherein said comparison circuit transmits a bus grant signal to a storage device, said bus grant signal representing a pending grant of said only one of said coinciding requests.

27. The arbitration circuit as recited in claim 21 wherein said initial arbitration values are loaded into said storage circuit via a port coupled to said bus.

28. The arbitration circuit as recited in claim 21 wherein said storage circuit is embodied in said tabulation circuit.

29. The arbitration circuit as recited in claim 21 wherein a port coupled to said tabulation circuit allows said relative number of times each of said plurality of devices requests said designation as said bus master to be read from said tabulation circuit.

30. The arbitration circuit as recited in claim 21 wherein a deadlock circuit coupled to said tabulation circuit comprises a plurality of comparators for comparing predetermined priorities among said plurality of devices to thereby determine which one of said plurality of devices is to function as said bus master when said two of said plurality of devices have requested said designation as said bus master an equal relative number of times.

31. In a personal computer (PC) having a plurality of devices coupled to a bus, said plurality of devices having a bus master mode allowing a selected one of said devices to function as a bus master and adapted to request designation as a bus master, a method for determining which one of said plurality of devices is to function as said bus master when two of said plurality of devices coincidentally request said designation, comprising the steps of:

counting a relative number of times each of said plurality of devices requests said designation as said bus master;

providing a comparator for comparing numbers of times said each of said plurality of devices requests said designation as said bus master;

granting only one of said coinciding requests as a function of said relative number of times to thereby allow a bus master priority level between said plurality of devices to change as a function of an activity of said plurality of devices;

storing initial arbitration values, said initial arbitration values initially determining which of said plurality of devices is to function as said bus master; and controlling assertion of grants onto said bus.

32. The method as recited in claim 31 wherein said step of counting comprises the step of changing a state of a counter when said request for designation is made.

33. The method as recited in claim 31 wherein said step of counting comprises the step of providing a plurality of counting circuits corresponding to each of said plurality of devices.

34. The method as recited in claim 31 wherein said step of counting comprises the step of providing a first counting circuit corresponding to a first device of said plurality of devices and a second counting circuit corresponding to a second device of said plurality of devices, said first counting circuit incrementing and said second counting circuit decrementing when said first device requests said designation.

35. The method as recited in claim 31 further comprising the step of providing a deadlock circuit for determining which one of said plurality of devices is to function as said bus master when said two of said plurality of devices have requested said designation as said bus master an equal relative number of times.

36. The method as recited in claim 31 further comprising the step of transmitting a bus grant signal to a storage device, said bus grant signal representing a pending grant of said only one of said coinciding requests.

37. The method as recited in claim 31 further comprising the step of loading said initial arbitration values into a storage circuit via a port coupled to said bus.

38. The method as recited in claim 31 wherein said step of storing comprises the step of embodying a storage circuit in a tabulation circuit.

39. The method as recited in claim 31 further comprising the step of reading said relative number of times each of said plurality of devices requests said designation as said bus master.

40. The method as recited in claim 31 further comprising the step of providing a plurality of comparators for comparing predetermined priorities among said plurality of devices to thereby determine which one of said plurality of devices is to function as said bus master when said two of said plurality of devices have requested said designation as said bus master an equal relative number of times.

41. In a personal computer (PC) having a plurality of devices coupled to a bus, said plurality of devices having a bus master mode allowing a selected one of said devices to function as a bus master and adapted to request designation as a bus master, an arbitration circuit for determining which one of said plurality of devices is to function as said bus master when two of said plurality of devices coincidentally request said designation, comprising:

a tabulation circuit for counting a relative number of times each of said plurality of devices requests said designation as said bus master and comprising a first counting circuit corresponding to a first device of said plurality of devices and a second counting circuit corresponding to a second device of said plurality of devices, said first counting circuit incrementing and said second counting circuit decrementing when said first device requests said designation;

a comparison circuit coupled to said tabulation circuit for granting only one of said coinciding requests as a function of said relative number of times and comprising a comparator for comparing a state of said first and second counting circuits to thereby allow a bus master priority level between said plurality of devices to change as a function of an activity of said first and second devices;

a deadlock circuit for determining which one of said plurality of devices is to function as said bus master when said two of said plurality of devices have requested said designation as said bus master an equal relative number of times;

a storage circuit for storing initial arbitration values, said initial arbitration values initially determining which of said plurality of devices is to function as said bus master; and bus monitoring circuitry for controlling assertion of grants onto said bus.

42. The arbitration circuit as recited in claim 41 wherein said comparison circuit transmits a bus grant signal to a storage device, said bus grant signal representing a pending grant of said only one of said coinciding requests.

43. The arbitration circuit as recited in claim 41 wherein said initial arbitration values are loaded into said storage circuit via a port coupled to said bus.

44. The arbitration circuit as recited in claim 41 wherein a port coupled to said tabulation circuit allows said relative number of times each of said plurality of devices requests said designation as said bus master to be read from said tabulation circuit.

45. The arbitration circuit as recited in claim 41 wherein a deadlock circuit coupled to said tabulation circuit comprises a plurality of comparators for comparing predetermined priorities among said plurality of devices to thereby determine which one of said plurality of devices is to function as said bus master when said two of said plurality of devices have requested said designation as said bus master an equal relative number of times.

46. In a personal computer (PC) having a plurality of devices coupled to a bus, said plurality of devices having a bus master mode allowing a selected one of said devices to function as a bus master and adapted to request designation as a bus master, a method for determining which one of said plurality of devices is to function as said bus master when two of said plurality of devices coincidentally request said designation, comprising the steps of:

counting a relative number of times each of said plurality of devices requests said designation as said bus master, said step of counting comprising the step of providing a first counting circuit corresponding to a first device of said plurality of devices and a second counting circuit corresponding to a second device of said plurality of devices, said first counting circuit incrementing and said second counting circuit decrementing when said first device requests said designation;

providing a comparator for comparing a state of said first and second counting circuits;

granting only one of said coinciding requests as a function of said state of said first and second counting circuits to thereby allow a bus master priority level between said plurality of devices to change as a function of an activity of said plurality of devices;

providing a deadlock circuit for determining which one of said plurality of devices is to function as said bus master when said two of said plurality of devices have requested said designation as said bus master an equal relative number of times;

providing a storage circuit for storing initial arbitration values, said initial arbitration values initially determining which of said plurality of devices is to function as said bus master; and controlling assertion of grants onto said bus.

47. The method as recited in claim 46 further comprising the step of transmitting a bus grant signal to a storage device, said bus grant signal representing a pending grant of said only one of said coinciding requests.

48. The method as recited in claim 46 further comprising the step of loading said initial arbitration values into said storage circuit via a port coupled to said bus.

49. The method as recited in claim 46 further comprising the step of reading said relative number of times each of said plurality of devices requests said designation as said bus master.

50. The method as recited in claim 46 further comprising the step of providing a plurality of comparators for comparing predetermined priorities among said plurality of devices to thereby determine which one of said plurality of devices is to function as said bus master when said two of said plurality of devices have requested said designation as said bus master an equal relative number of times.

* * * * *